(No Model.)

H. M. HANMORE.
NON HEAT CONDUCTING FABRIC.

No. 386,981. Patented July 31, 1888.

Witnesses:
Joseph W. Roe.
O. Sundgren.

Inventor:
Hiram M. Hanmore
by attorneys
Brown & Ball

UNITED STATES PATENT OFFICE.

HIRAM M. HANMORE, OF CAMDEN, NEW JERSEY.

NON-HEAT-CONDUCTING FABRIC.

SPECIFICATION forming part of Letters Patent No. 386,981, dated July 31, 1888.

Application filed March 6, 1888. Serial No. 266,342. (No model.)

*To all whom it may concern:*

Be it known that I, HIRAM M. HANMORE, of Camden, in the county of Camden and State of New Jersey, have invented a new and useful Improvement in Non-Heat-Conducting Fabrics, of which the following is a specification, reference being had to the accompanying drawings.

This invention consists in a fabric composed of tule-grass and a plastic mineral substance or composition, in which the said grass is embedded. In some cases I weave the tule-grass into a mat and fill the interstices of the mat and completely envelop it with the plastic mineral substance or composition; and in some cases I simply lay the stalks of the grass close together and embed them in and envelop them, and so unite them together by the plastic mineral substance or compound.

The fabric may be made in the form of slabs, blocks, or shells of suitable shape according to the form of the article or structure to which they are to be applied, to prevent loss of heat therefrom, or to protect them from heat.

Figure 1:
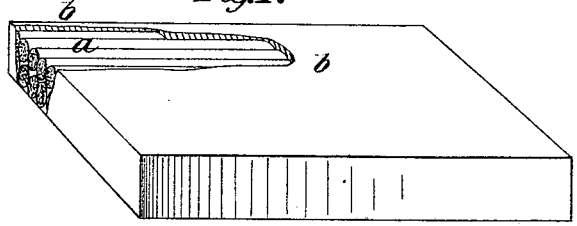
Figure 2:
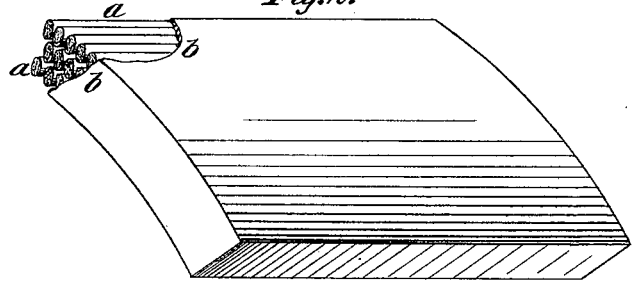
Figure 3:
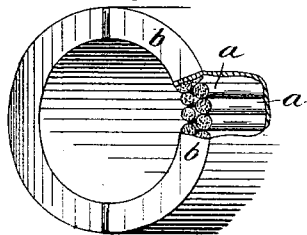
Figure 4:
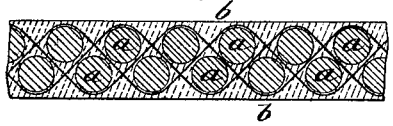

In the accompanying drawings, Figure 1 is a perspective view of a flat slab, consisting of layers of tule-grass, *a*, and a covering of plaster-of-paris, *b*, in which the grass, the spires *a* of which are arranged close together side by side and one upon another, is enveloped and embedded in such manner that the interstices between the spires are filled up. Fig. 2 is a perspective view of a curved slab of similar construction or composition. Fig. 3 is a perspective view of two semi-cylindrical shells of similar composition or structure, forming a jacket for a steam-pipe. Fig. 4 is a transverse sectional view of a slab in which the spires of the grass are woven together with threads *c*, which form the warp, the grass forming the weft.

The slabs, blocks, or shells are formed by placing the tule-grass, either woven into a mat or with its spires simply arranged side by side one upon another, in a mold, into which the plaster-of-paris or mineral substance or compound mixed with sufficient water to render it plastic or semi-fluid is poured or introduced in such manner as to fill up all the interstices between the spires and embed, unite, and envelop them together. The plaster-of-paris or plastic mineral substance having set hard, the slab or block may be removed and dried, when it is ready to be applied to the structure in which it is to confine the heat, or to protect.

The great merit of this fabric as a non-conductor of heat depends in a great degree upon the exceedingly numerous capillary tubes of which the tule-grass is composed and in which air is confined. The plaster-of-paris or plastic material serves the purposes of filling the interstices between the spires of the grass, of uniting the spires into a compact structure or fabric, and is itself a good non-conductor.

What I claim as my invention, and desire to secure by Letters Patent, is—

1. The non-heat-conducting fabric herein described, consisting of tule-grass and a plastic mineral substance in which the spires of the said grass are embedded and enveloped, and which fills the interstices between them and unites them, substantially as herein set forth.

2. The non-heat-conducting fabric herein described, consisting of a woven fabric of tule-grass and a plastic mineral substance in which said woven fabric is embedded and enveloped, substantially as herein set forth.

HIRAM M. HANMORE.

Witnesses:
FREDK. HAYNES,
JOS. W. ROE.